United States Patent [19]
Sink et al.

[11] Patent Number: 6,057,670
[45] Date of Patent: May 2, 2000

[54] SMART CONNECTOR FOR RECHARGEABLE BATTERY

[75] Inventors: Michael S. Sink, Boone, N.C.; Glen V. Bowling, New Milford, Conn.

[73] Assignees: Saft America, Inc., Valdosta, Ga.; Alcatel, Paris, France

[21] Appl. No.: 09/185,582

[22] Filed: Nov. 4, 1998

[51] Int. Cl.[7] .................................................. H01M 10/44
[52] U.S. Cl. .......................................... 320/117; 320/119
[58] Field of Search .................................... 320/103, 116, 320/117, 119, 121

[56] References Cited

U.S. PATENT DOCUMENTS

| | | |
|---|---|---|
| 4,039,898 | 8/1977 | Iwata et al. . |
| 4,114,082 | 9/1978 | Scheidler . |
| 4,139,812 | 2/1979 | Huggins . |
| 5,218,284 | 6/1993 | Burns et al. . |
| 5,225,761 | 7/1993 | Albright . |
| 5,233,282 | 8/1993 | Iwashita . |
| 5,391,973 | 2/1995 | Tomazic . |
| 5,594,320 | 1/1997 | Pacholok et al. . |
| 5,729,117 | 3/1998 | Fukuda . |

*Primary Examiner*—Edward H. Tso
*Attorney, Agent, or Firm*—Sughrue, Mion, Zinn, Macpeak & Seas, PLLC

[57] ABSTRACT

A smart charge connector is provided incorporating a switching feature allowing the cells in a multi-cell battery to be uniformly charged. When engaged with a charger, the smart connector will connect the cells in parallel so that all cells within the same battery will be charged uniformly to the same voltage level eliminating the uneven charging that occurs when cells are charged in series connected strings. During normal operation the connector connects the cells of the battery in series to supply a battery output voltage. However, when the connector is engaged with a charger, the cells are connected in parallel to be charged by a source of electrical power at a voltage higher than the battery output voltage. The connector includes a number of switch contacts that are activated when the connector is engaged with the charger allowing the cells to be charged in parallel. The switch contacts automatically reconnect the cells in series upon removal of the charger.

10 Claims, 5 Drawing Sheets

SMART CONNECTOR FOR RECHARGEABLE BATTERY

BACKGROUND

The present invention generally relates to rechargeable batteries and in particular to a smart connector for rechargeable batteries.

Rechargeable multi-cell batteries are used in many different applications. Each of the cells in the multi-cell batteries are typically connected in series to supply a battery output voltage. Examples of popular rechargeable batteries that enjoy wide use are NiCd (Nickel Cadium) and Ni-Metal hydride batteries. With the increased demand for portable self powered devices, such as cellular phones, for example, and better battery performance, lithium-ion based batteries are now becoming popular. However, although these batteries are currently used in many applications, recharging of multi-cell series connect batteries has generally been a complicated process. Historically, assuring that each of the individual cells in a multi-cell series connected battery is uniformly recharged has been a technical challenge. Typically, in order to accomplish uniform charging of the individual cells connected in series, special monitoring and control circuits have been used.

In the case of lithium-ion rechargeable batteries it is extremely important to assure that the cells are uniformly recharged. In order to maintain the optimal performance and longevity of the battery, in addition to avoiding damage to the cells. Multi-cell rechargeable lithium ion batteries require the protection of each individual cell connected in series in order to prevent an over-voltage condition which could damage or impair optimal recharging of the cells. Protection from the over-voltage condition is accomplished through use of relatively expensive electronic control circuitry to monitor the voltage and charging rate of each individual cell. In addition, if the cells vary in capacity a balancing circuit may also be required in order to ensure the proper charging of the individual cells. Furthermore, in the past, chargers have been used that are specifically designed for the type of battery being charged in order to protect the battery from damage. As a result, chargers have been notoriously incompatible.

Currently, NiCd and Ni-Metal Hydride cells are first tested and screened for capacity and performance before they are placed in batteries, in order to provide for uniform charging. Once placed in a battery, the cells are connected and charged in series. As a result, NiCd and Ni-Metal Hydride batteries require dedicated chargers designed specifically for the battery's individual configuration and charge characteristics.

SUMMARY

It is therefore an object of the invention to reduce the complexity associated with current charging circuits for multi-cell batteries.

It is another object of the invention to provide a universal connector for all cell configurations allowing the use of different chargers for the multi-cell batteries.

It is a further object of the present invention to eliminate the need for complex monitoring and control circuitry, balancing circuitry, or cell testing or screening for charging multi-cell batteries.

According to an exemplary embodiment of the present invention the foregoing and other objects are accomplished through implementation of a smart charge connector incorporating a switching feature allowing all cells in a multi-cell battery to be uniformly charged. According to the present invention, when engaged with a charger, the smart charge connector will connect the cells in parallel so that all cells within the same battery will be charged uniformly to the same voltage level thereby eliminating any uneven charging that would occur when cells are charged in series connected strings.

According to the present invention, during normal operation (battery operation mode), the smart charge connector connects the cells in series to supply a battery output voltage. However, when the smart charge connector is connected to or engaged with a charger (battery charging mode), the cells are then connected in parallel for charging by a source of electrical power equal to full charge voltage of individual cells. According to an exemplary embodiment of the invention, the smart charge connector includes a number of switches that are activated when the smart charge connector is engaged with the charger allowing the cells to be charged in parallel. The switch contacts may automatically reconnect the cells in series upon disconnecting of the charger thereby returning the connector to the battery operation mode.

BRIEF DESCRIPTION OF THE DRAWINGS

The foregoing and other features, objects, and advantages of the invention will be better understood by reading the following description in conjunction with the drawings, in which.

DETAILED DESCRIPTION

Figure 1A:
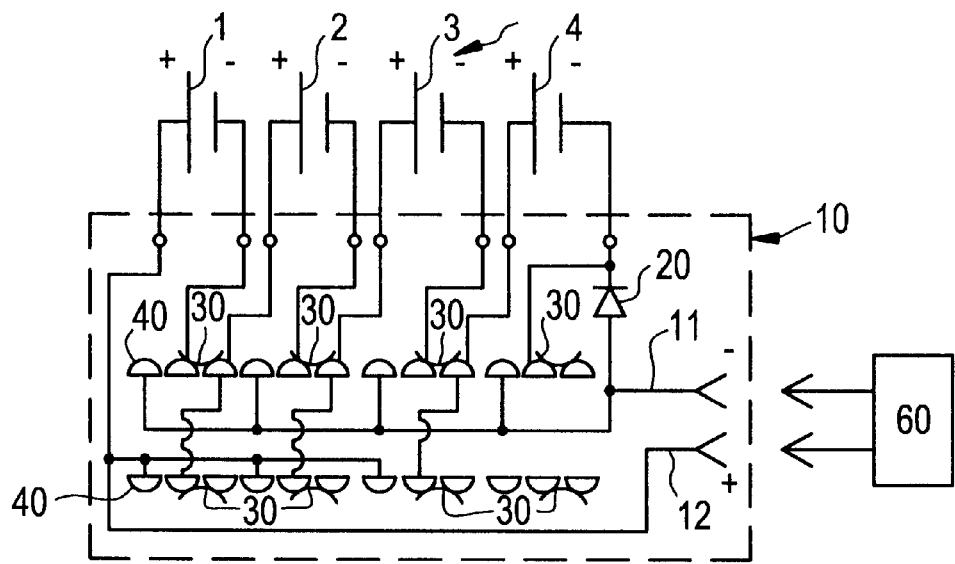
FIG. 1A shows a smart charge connector and switch assembly in a battery operation mode according to an exemplary embodiment of the invention.

The various features of the invention will now be described with respect to the figures, in which like parts are identified with the same reference characters.

Figure 1B:
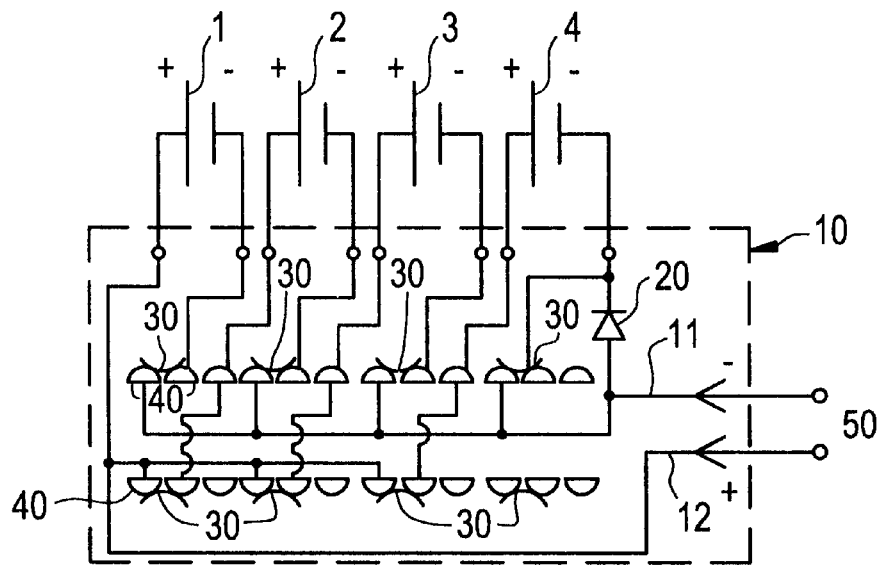
FIG. 1B shows a smart charge connector switch and assembly in a battery charging mode according to an exemplary embodiment of the invention.
Figure 1C:
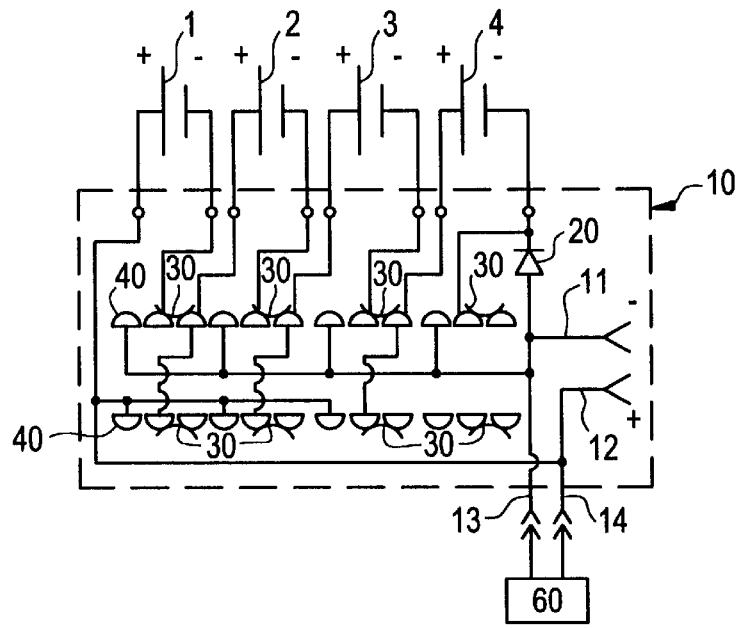
FIG. 1C shows an alternative smart charge connector and switch assembly with separate charge and discharge terminals in a battery operation mode according to an exemplary embodiment of the invention.
Figure 1D:
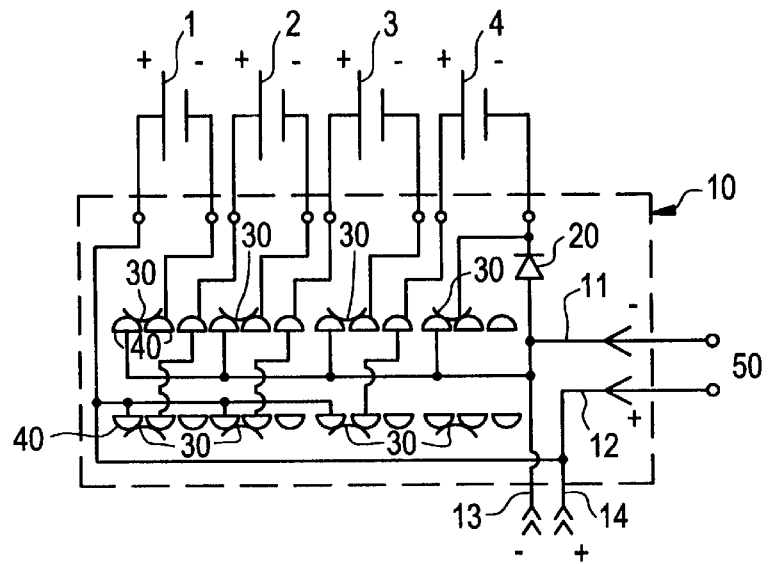
FIG. 1D shows an alternative smart charge connector and switch assembly with separate charge and discharge terminals in a battery charging mode according to an exemplary embodiment of the invention.

FIGS. 1A and 1B show a smart charge connector and switch assembly according to an exemplary embodiment of the invention. Turning to the figures, a plurality of cells 1, 2, 3, and 4 are shown. One skilled in the art will appreciate that the cells shown are for exemplary purposes only, and that the number and type of cells can be varied without departing from the present invention. For example, the cells could be those making up a lithium-ion based secondary battery, a NiCd, or Ni Metal hydride battery. Also shown is a smart charge connector/switch assembly 10. According to one embodiment of the present invention, the cells 1–4 may be wired into the smart charge connector/switch assembly 10. The smart charge connector/assembly 10 is also provided with a negative terminal 11 and a positive terminal 12. In one embodiment of the invention, the terminals 11 and 12 can be used to both charge and discharge the cells 1–4 in conjunction with a dedicated charger whereby only the proper charging connector actuates the parallel switching for charging. Alternatively, if a dedicated charger is not provided, a separate set of terminals 13 and 14 may be provided to discharge the cells 1–4 in addition to the terminals 11 and 12 for charging the cells. Terminals 13 and 14 could be standard terminals, for example, when the invention is used to retrofit and existing battery.

FIG. 1A illustrates the battery operation mode of the smart charge connector/switch assembly 10. According to this embodiment, a plurality of switches 30 forming a connector switch (not shown) connect the cells 1–4 in series through a plurality contacts 40. Each of the terminals of each cells 1–4 is electrically connected to a contact 40. The switches 30 provide an electrical connection between two contacts 40 in order to complete a circuit. Also shown is a diode 20 connected between the negative terminal 11 and the negative terminal of cell 4. The diode 20 prevents charging by a non-compatible charger through the smart charge connector/switch assembly 10 or through the standard output terminals 13 and 14. When the smart charge connector/switch assembly 10 is in battery operation mode, the terminals 11 and 12, or 13 and 14, may be connected to a circuit 60, for example. The terminals allow the cells 1–4 to discharge in series and provide a battery output voltage across the terminals in order to provide a power source to the circuit 60.

Turning to FIG. 1B a battery charging mode configuration of the smart charge connector/switch assembly 10 is shown. A compatible electrical power source 50 is shown connected to the smart charge connector switch assembly 10. A skilled artisan will appreciate many different types of electrical power sources may be used, however, the power source 50 is preferably at a voltage equal to the charged voltage of the individual cells. When the power source 50 is connected to the smart charge connector/switch assembly 10, the switches 30 move to the secondary positions shown in FIG. 1B. As illustrated in exemplary embodiment shown in FIG. 1B, all the switches 30 slide one contact 40 to the left. When the switches 30 move to their secondary positions, the diode 20 is bypassed allowing charging of the cells 1–4. This results in a new circuit configuration in which all of the cells 1–4 are now connected in parallel to the power source 50 allowing charging of the cells 1–4. As shown in FIG. 11B once the cells 1–4 are connected in parallel, the cells 1–4 can be uniformly charged to the same voltage level by the power source 50.

According to this exemplary embodiment there is no need for any complex monitoring or charge control circuitry typically required for lithium cells, for example. The need for testing and selection of cells currently used for NiCd and Ni-Metal hydride batteries is also unnecessary according to the invention. Additionally, this embodiment enables the design of a single charger that can be used for all battery configurations.

One skilled in the art will appreciate that the movement of switches 30 may be effectuated by any number of well known actuator assemblies. For example, according to the exemplary embodiment shown in FIGS. 1A an 1B, a pin-type actuator (not shown) could be used. When the power source 50 is connected, a pin connected to the power source housing or connector would mate with the smart charge connector/switch assembly 10 causing the switches 30 to slide one contact 40 to the left, thereby providing the parallel connection of the cells 1–4. Once the power source 50 is removed, along with the mating pin, the switches 30 can be spring activated, for example, to automatically return to the their original position shown in FIG. 1A, reconnecting the cells in series, and returning the smart charge connector/switch assembly 10 to the battery operation mode.

Figure 2A:
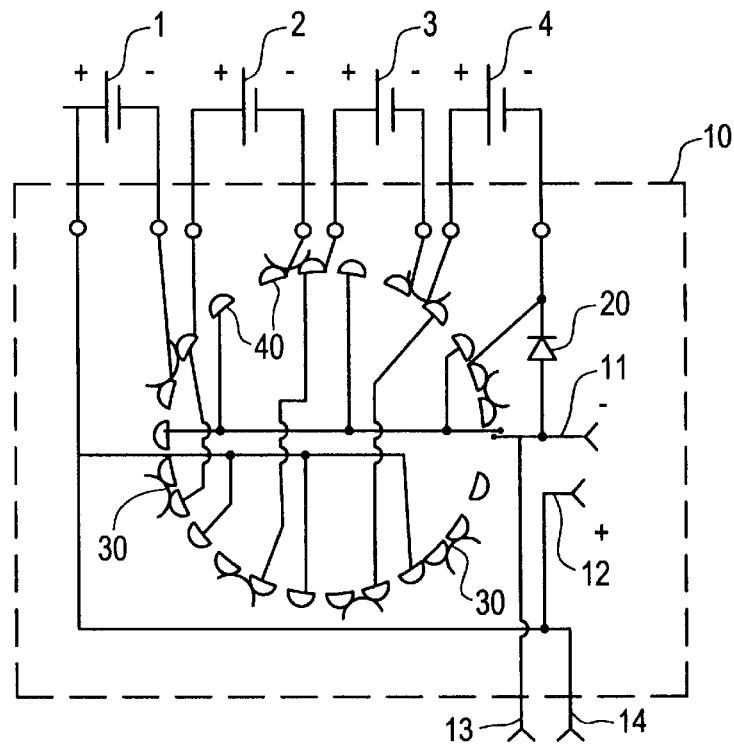
FIG. 2A shows a smart charge connector and switch assembly in a battery operation mode according to an exemplary embodiment of the invention.
Figure 2B:
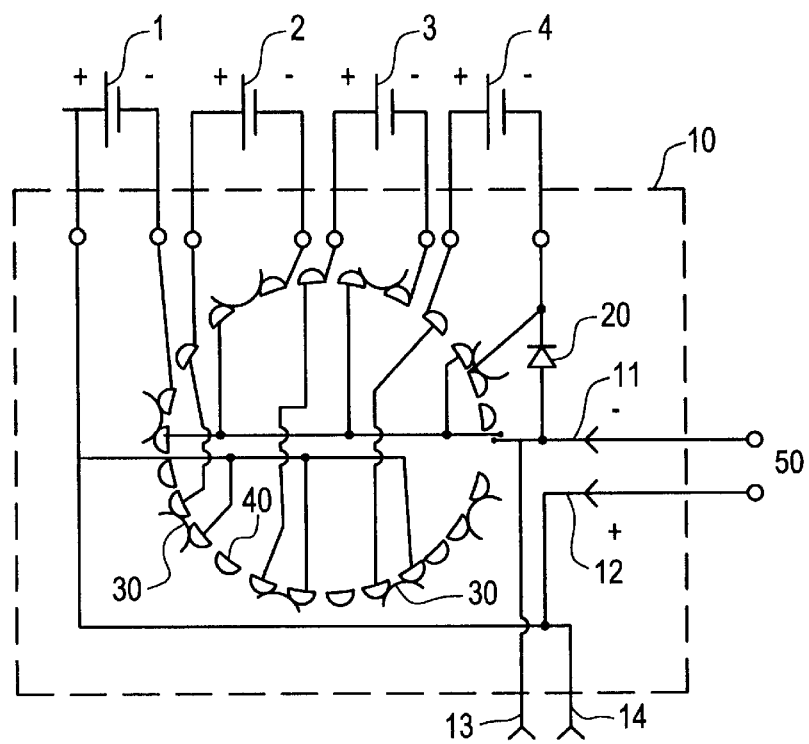
FIG. 2B shows a smart charge connector and switch assembly in a battery charging mode according to another exemplary embodiment of the invention.

FIGS. 2A and 2B show an alternative configuration of the contacts 40 and switches 30 according to another embodiment of the present invention. According to the embodiments shown in FIGS. 2A and 2B the contacts 40 and switches 30 are configured in a circular orientation. A power source 50, according to this embodiment, could then be inserted and turned in order to lock to the smart charge connector/switch assembly 10 to the power source. Once inserted into a slot the power source housing or connector mechanically engages the switches 30. By twisting the housing or power source connector the switches 30 can be caused to rotate one contact 40 counterclockwise, for example, to engage the parallel connection of the cells 1–4 and activate the battery charging mode and lock the power source 50 to the smart charge connector/switch assembly. An advantage of this embodiment is that a good lock between the smart charge connector/switch assembly 10 and charger is provided and maintained during charging. Twisting the charger 50 in a clockwise direction would then unlock the power source 50 from the smart charge connector/switch assembly 10 and return the switches 30 to their original positions returning the assembly 10 to battery operation mode.

Figure 3A:
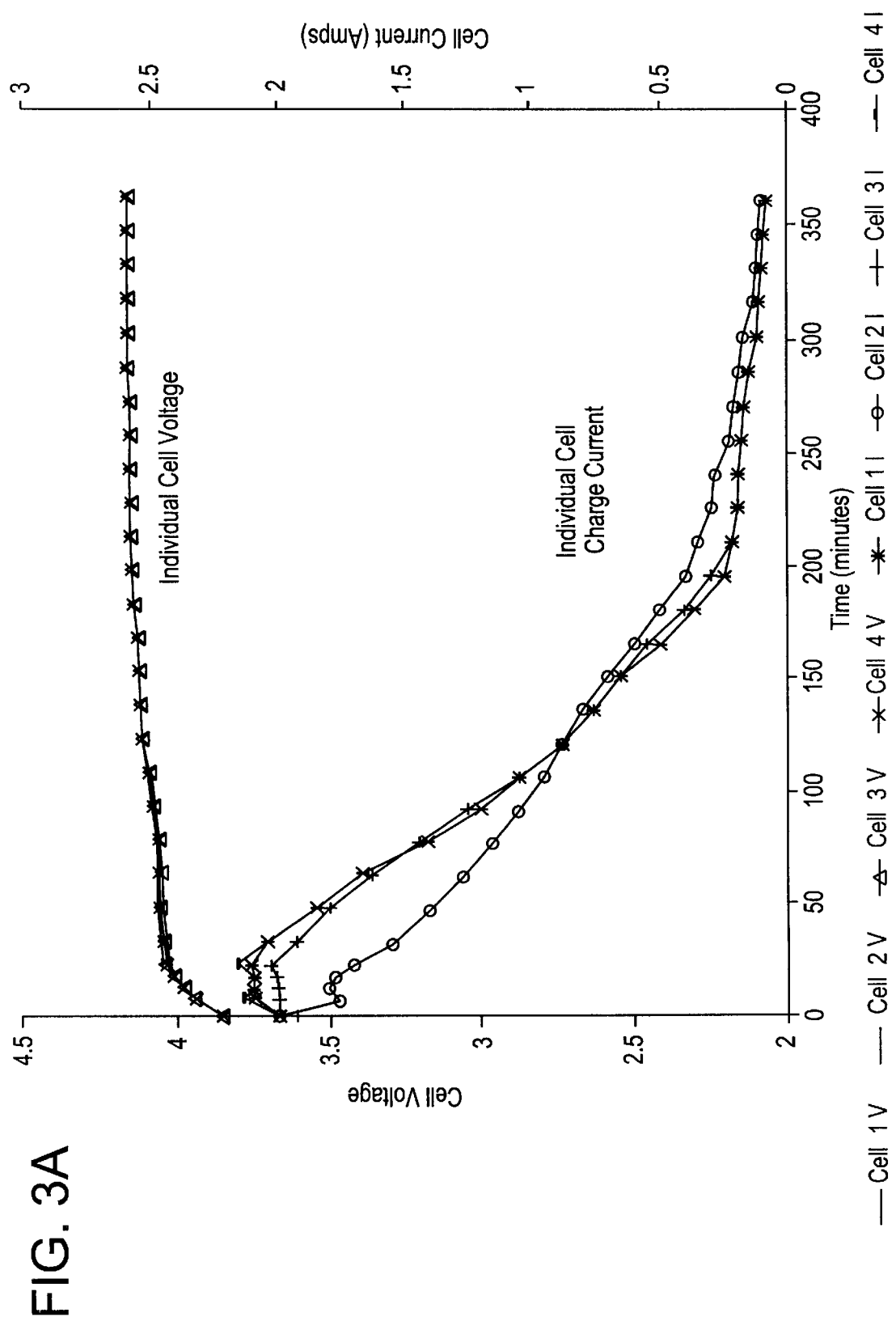
FIGS. 3A and 3B show typical charge and discharge curves according to an embodiment of the invention.
Figure 3B:
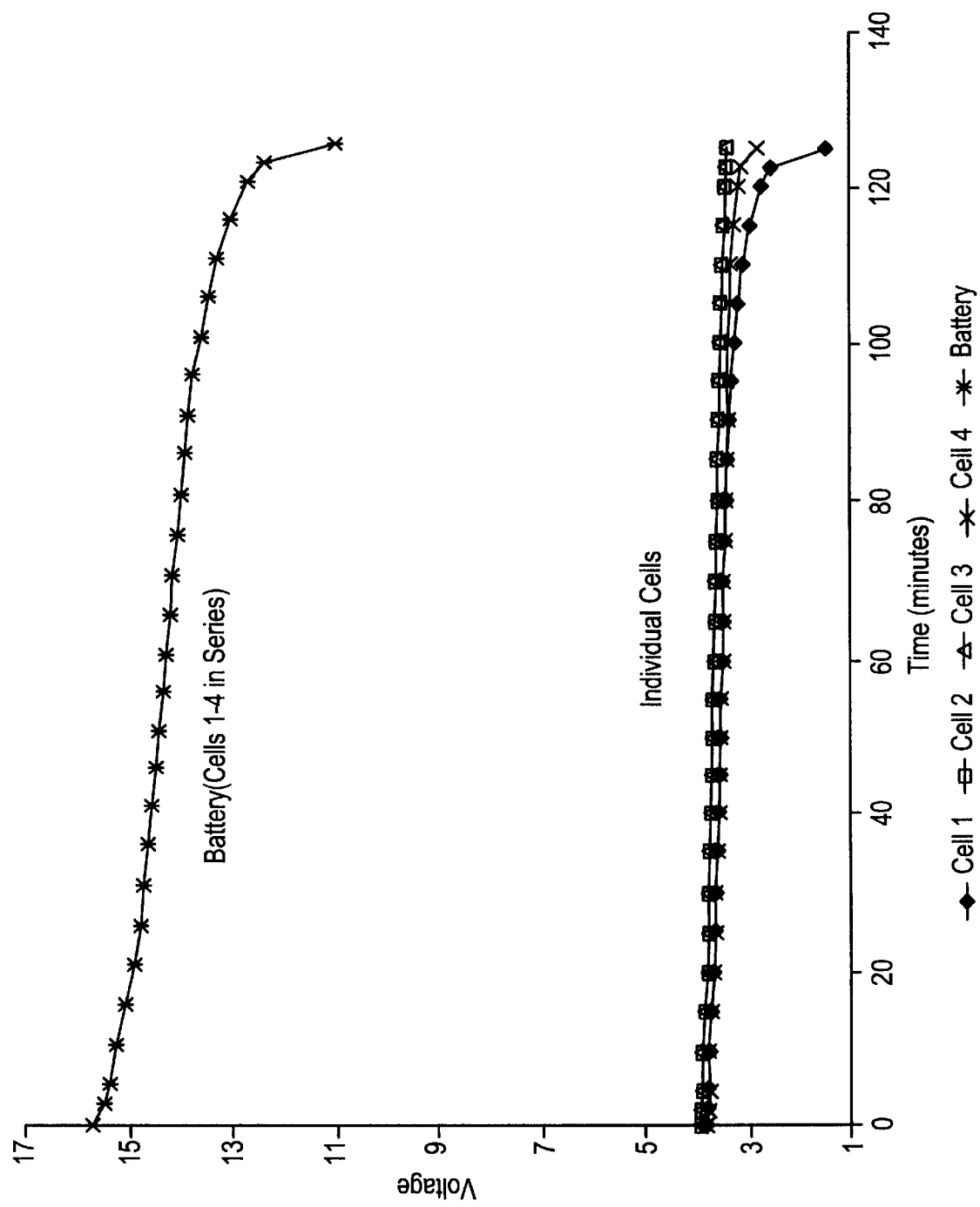

Typical charge and discharge curves, according to an exemplary embodiment of the invention are shown in FIGS. 3A and 3B for the 100th cycle of a 4-cell lithium ion rechargeable battery that has been processed through over 200 cycles. The battery in this example was cycled using series connected discharge and parallel connected charge according to the switching concept as described in this disclosure. According to the present invention, no electronic protection circuitry was required for the individual cells or the battery as has been traditionally provided for this type of battery according to conventional battery charging. The discharge curves in FIG. 3A show the overall battery (4 cell series) and each individual cell voltages for 2 amp discharge. The charge curves in FIG. 3B, show the individual cell voltages and their charging current during a 6 hour charge cycle. Over the life of the battery, the voltage and charge current characteristics of each cell in the battery have remained consistent from cycle to cycle. The cell that has the lowest capacity (reaches low cutoff voltage first) always has the higher current initially during charge cycle. The charging current to the higher capacity cells in the battery eventually crosses over the lower capacity cells and at the end all four are equal. Accordingly, the present invention provides a simple and efficient means of evenly recharging battery cells without the need for complex protection and monitoring circuitry.

The present invention has been described by way of example, and modifications and variations of the exemplary embodiments will suggest themselves to skilled artisans in this field without departing from the spirit of the invention. For example, one skilled in the art would appreciate that different configurations for connecting the power sources to the assembly could also be implemented according to the present invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A connection circuit for charging a battery including a plurality of cells comprising:

a first circuit for connecting the plurality of cells in series to discharge the plurality of cells;

a second circuit for connecting the plurality of cells in parallel and charging the cells; and a switch assembly for completing said first or second circuit, said switch assembly including an input for a power source connector, wherein attachment of said power source connector to said input automatically mechanically engages said switch assembly to break said first circuit and complete said second circuit to charge the plurality of cells and removal of said power source connector from said input automatically mechanically disengages said switch assembly to break said second circuit and complete said first circuit.

2. The connection circuit of claim 1, wherein said switch assembly further comprises a plurality of contact switches that are mechanically activated by attaching said power source connector to said input whereby the contacts of said switches mechanically move from a first contact position to a second contact position completing said second circuit and placing said connection circuit in a battery charging mode.

3. The connection circuit of claim 2, wherein said plurality of contact switches automatically completes said first circuit when said power source connector is disconnected from said input thereby placing said connection circuit in a battery operation mode.

4. The connection circuit of claim 1 further comprising a diode connected to said input, wherein said diode prevents charging of the cells when said first circuit is completed.

5. The connection circuit of claim 1, wherein the cells are one of lithium-ion, NiCd, or Ni-Metal Hydride.

6. A connection circuit for a battery including a plurality of cells and a pair of terminals for connection to a power supply connector, the circuit comprising:

a first circuit connecting the cells in series to supply a battery output voltage;

a second circuit connecting the cells in parallel to charge the cells;

means for selecting said first circuit when the power supply connector is attached to the terminals and for selecting said second circuit when the power supply is removed from the terminals including a plurality of contact switches which are arrayed in a first position when said power supply connector is attached and are arrayed in a second position when said power supply connector is removed, wherein the cell that has the lowest capacity has a higher initial current than any of the other plurality of cells.

7. The connection circuit of claim 6, wherein the charging current to the plurality of cells with higher capacity eventually crosses that of the lower capacity cells until the plurality of cells are equal.

8. A battery comprising:

a pair of terminals;

a plurality of cells;

a first circuit for connecting the plurality of cells in series to discharge the plurality of cells through said terminals;

a second circuit for connecting the plurality of cells in parallel and charging the cells; and a switch assembly for completing said first or second circuit, said switch assembly including an input for attaching to a power source connector, wherein when said power source connector is attached to said input, said power source connector automatically mechanically actuates said switch assembly to break said first circuit and complete said second circuit to charge the plurality of cells and when said power source connector is removed from said input said switch assembly automatically breaks said second circuit and completes said first circuit.

9. A battery according to claim 8, wherein said battery is a lithium based secondary battery.

10. A battery according to claim 8, wherein said battery is NiCd or Ni-Metal Hydride battery.

* * * * *